(12) United States Patent
Takamura

(10) Patent No.: US 10,894,487 B2
(45) Date of Patent: Jan. 19, 2021

(54) VEHICLE

(71) Applicant: HONDA MOTOR CO., LTD., Tokyo (JP)

(72) Inventor: Yuki Takamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 16/506,090

(22) Filed: Jul. 9, 2019

(65) Prior Publication Data

US 2020/0039385 A1  Feb. 6, 2020

(30) Foreign Application Priority Data

Aug. 6, 2018 (JP) .................................. 2018-147508

(51) Int. Cl.
*B60N 2/01* (2006.01)
*B60N 2/90* (2018.01)
*B60N 2/24* (2006.01)
*B62D 47/00* (2006.01)

(52) U.S. Cl.
CPC ................. *B60N 2/01* (2013.01); *B60N 2/24* (2013.01); *B60N 2/90* (2018.02); *B62D 47/00* (2013.01)

(58) Field of Classification Search
CPC ... B60N 2/01; B60N 2/90; B60N 2/24; B60N 2/242; B60N 2/449; B60N 2/646
USPC .......................................................... 296/64
See application file for complete search history.

(56) References Cited

U.S. PATENT DOCUMENTS

| 4,162,099 A * | 7/1979 | Schopf | B60N 2/24 296/178 |
| 4,188,060 A * | 2/1980 | Alcanzare | B60P 3/423 296/63 |
| 4,319,777 A * | 3/1982 | Law | B60N 2/01 296/14 |
| 2007/0046084 A1 * | 3/2007 | Leach | A47C 7/021 297/250.1 |
| 2013/0169019 A1 * | 7/2013 | Hisada | B60N 2/643 297/440.1 |
| 2019/0016287 A1 * | 1/2019 | Amidon | B60P 3/03 |

FOREIGN PATENT DOCUMENTS

| FR | 2291081 A1 * | 6/1976 | ............ B60N 2/242 |
| JP | 2017039400 A | 2/2017 | |

* cited by examiner

*Primary Examiner* — Dennis H Pedder
(74) *Attorney, Agent, or Firm* — Armstrong Teasdale LLP

(57) ABSTRACT

A vehicle includes a protruding body that protrudes upward from a floor surface in a central part of a cabin of the vehicle, wherein the protruding body includes one or more seating portions on an outer periphery thereof such that multiple passengers can sit on the one or more seating portions with a back of each passenger facing inward of the cabin.

4 Claims, 10 Drawing Sheets

VEHICLE

TECHNICAL FIELD

The present invention relates to a vehicle, and in particular to a vehicle with a novel seat arrangement.

In an autonomous vehicle, the driver is not required to be facing forward at all times, and therefore, the front seat may be selectively turned rearward so as to face the rear seat. See JP2017-039400A, for instance. Thus, the introduction of autonomous vehicles has created new possibilities for seat arrangement.

Also, ride share is receiving a growing attention from the view point of reducing traffic congestion and CO2 emission. In a ride share, groups of people sharing common destinations share common vehicles. Oftentimes, people sharing a ride may be strangers to one another. Therefore, some consideration may be desired in seating the people sharing the ride so as to maximize privacy and minimize stress.

Particularly, in a vehicle having a small cabin space and a seating capacity of several passengers, if a passenger catch a gaze of an adjoining passenger, an awkward situation may be created in which the passengers tend to feel stress.

SUMMARY OF THE INVENTION

In view of such a background of the prior art, a primary object of the present invention is to provide a vehicle that can provide a comfortable cabin space to minimize stress of the passengers even when the passengers of the vehicle are not specified (and hence the passengers may be strangers to one another).

To achieve such an object, one embodiment of the present invention provides vehicle (1) comprising a protruding body (30, 40, 51, 61, 72) that protrudes upward from a floor surface (6) in a central part of a cabin (5) of the vehicle (1), wherein the protruding body includes one or more seating portions (32, 41, 52, 62, 73) on an outer periphery thereof such that multiple passengers can sit on the one or more seating portions with a back of each passenger facing inward of the cabin (5).

According to this configuration, the passengers seated on the seating portion (32, 41, 52, 62, 73) do not catch each other's gaze easily and an awkward situation tends not to occur. Thus, the vehicle (1) can provide a comfortable cabin space to minimize stress of the passengers even when the passengers of the vehicle are not specified.

In the above vehicle (1), preferably, the one or more seating portions include seating portions (32) that define seating surfaces having different heights from one another.

According to this configuration, the eye heights of the passengers seated on the seating portions (32) are varied, and this contributes to preventing the passengers from catching each other's gaze easily. Further, each passenger can choose the seat having a seating surface height that fits to his/her physique, which improves comfort.

In the above vehicle (1), preferably, the one or more seating portions include seating portions (32) that define seating surfaces having different surface areas from one another.

According to this configuration, each passenger can choose the seat having a seating surface area that fits to his/her physique, which improves comfort.

In the above vehicle (1), preferably, the protruding body (30) is constituted of a single protruding body (30) elongated in a fore and aft direction, and is provided with recessed portions (31) in multiple locations along an outer circumference thereof, each recessed portion (31) having a bottom defining a seating portion (32).

According to this configuration, passenger seats having respective seating portions (32) that are clearly separated from one another are constituted by merely forming multiple recessed portions (31) in the single protruding body (30), and therefore, a simple configuration is achieved.

In the above vehicle (1), preferably, the protruding body (40) is constituted of a single protruding body elongated in a fore and aft direction, and has a flat upper surface defining the one or more seating portions (41) on which multiple passengers can sit.

According to this configuration, the single protruding body (40) constitutes a passenger seat having a seating portion (41) on which multiple passengers can sit, and therefore, a simple configuration is achieved.

In the above vehicle (1), preferably, the upper surface of the protruding body is provided with an upright wall (42) that extends in the fore and aft direction.

According to this configuration, the upright wall (42) separates the upper surface of the protruding body (40) into left and right parts, and therefore, the separation between the left and right parts of the seating portion (41) defined by the upper surface is made clear.

In the above vehicle (1), preferably, the protruding body (51) is constituted of multiple cylindrical bodies (50) arranged in two rows in a staggered fashion in plan view, each cylindrical body (50) having an upper surface defining a seating portion (52).

According to this configuration, the number of the seating portions (52) can be easily increased and decreased by varying the number of the cylindrical bodies (50).

In the above vehicle (1), preferably, the protruding body (61) is constituted of multiple cylindrical bodies (60) arranged in two rows in a staggered fashion with the cylindrical bodies adjacent to each other in each row being in contact with each other in plan view, each cylindrical body (60) having an upper surface defining a seating portion (62).

According to this configuration, the seating portions (62) can be arranged densely, and the number of the seating portions (62) can be easily increased and decreased by varying the number of the cylindrical bodies (60).

In the above vehicle (1), preferably, the protruding body (72) includes a bag-shaped skin (70) and beads (71) filling the skin, such that the protruding body is deformable in accordance with loads of the passengers.

According to this configuration, the protruding body (72) is indefinite in shape such that recesses corresponding to the respective passengers are formed in the protruding body (72) due to the loads of the passengers seated thereon, to thereby form seats comfortable to sit on.

Thus, the vehicle according to an embodiment of the present invention can provide a comfortable cabin space to minimize stress of the passengers even when the passengers of the vehicle are not specified.

DESCRIPTION OF THE PREFERRED EMBODIMENT(S)

Preferred embodiments of a vehicle according to the present invention are described in the following with reference to the appended drawings.

Figure 1:
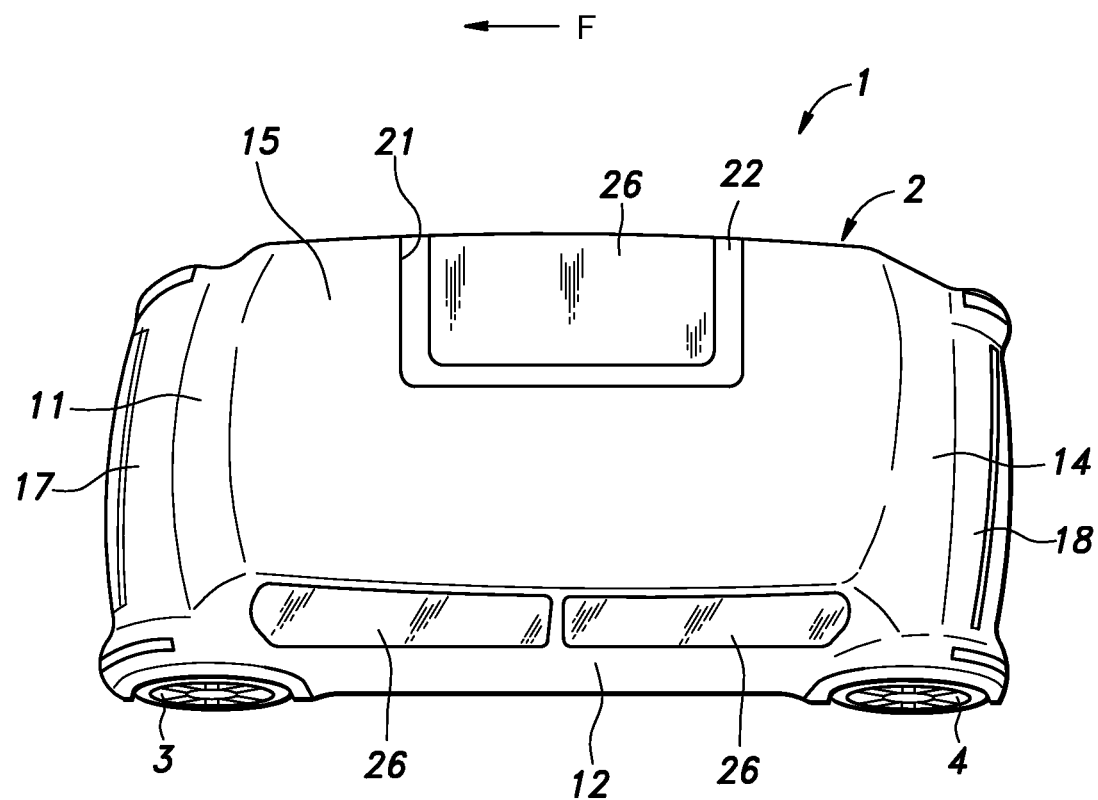
FIG. 1 is a perspective view of a vehicle according to a first embodiment of the present invention as viewed from an upper left direction.
Figure 2:
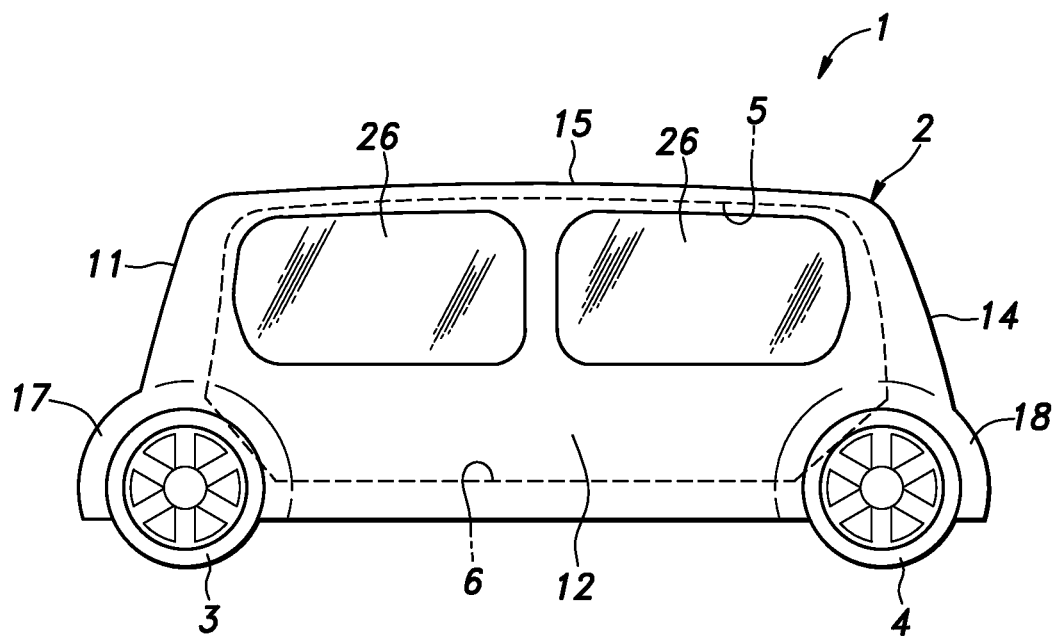
FIG. 2 is a left side view of the vehicle.
Figure 3:
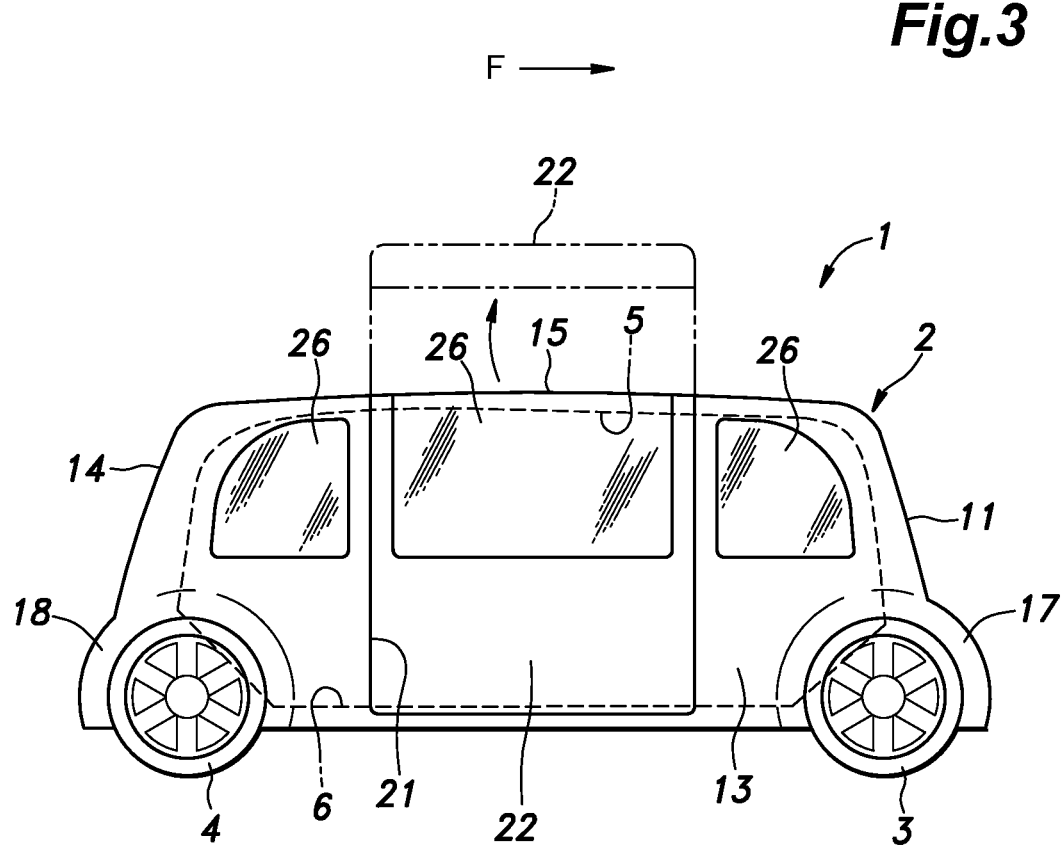
FIG. 3 is a right side view of the vehicle.

As shown in FIGS. 1 to 3, a vehicle 1 according to a first embodiment of the present invention consists of a four-wheeled vehicle (automobile). The vehicle 1 has a substantially rectangular vehicle body 2 elongated in the fore and aft direction. The vehicle body 2 is provided with a pair of front wheels 3 and a pair of rear wheels 4. The vehicle 1 may consist of an autonomous vehicle that does not require a driver.

As shown in FIGS. 1 to 4, a central part of the vehicle body 2 defines a substantially rectangular cabin 5 which is elongated in the fore and aft direction. The cabin 5 is defined by a floor 6, a front wall 11 extending laterally and vertically along a front edge of the floor 6, a left wall 12 extending rearward from the left edge of the front wall 11, a right wall 13 extending rearward from the right edge of the front wall 11, a rear wall 14 extending between the rear edges of the left wall 12 and the right wall 13, and a roof 15 connected to the upper edges of the front wall 11, the left wall 12, the right wall 13 and the rear wall 14.

A drive source for traveling such as an electric motor and an internal combustion engine, and a control unit such as an ECU are mounted either in a front part 17 of the vehicle body 2 located ahead of the front wall 11 or in a rear part 18 of the vehicle body 2 located behind the rear wall 14. The remaining available space in the vehicle front part 17 and the vehicle rear part 18 may be used as a luggage stowage space.

The right wall 13 is provided with a door opening 21 which is fitted with a door 22 for selectively closing the door opening 21. The door opening 21 extends from the lower end of the right wall 13 to a middle part of the roof 15. The door 22 in this embodiment consists of a gull-wing door, and is supported by the roof 15 at an upper end so as to be rotatable about a rotational axis (not shown in the drawings) extending in the fore and aft direction. Alternatively, the door 22 may consist of a regular swing door or a slide door. Windows 26 each fitted with a glass pane are provided in the remaining parts of the right wall 13 located ahead of and behind the door 22, in an upper part of the door 22, and in a large part of the left wall 12. For example, the vehicle 1 can be used as a means of transportation in a shopping mall, between terminals of an airport, or between a terminal and an airplane at an airport.

Figure 4:
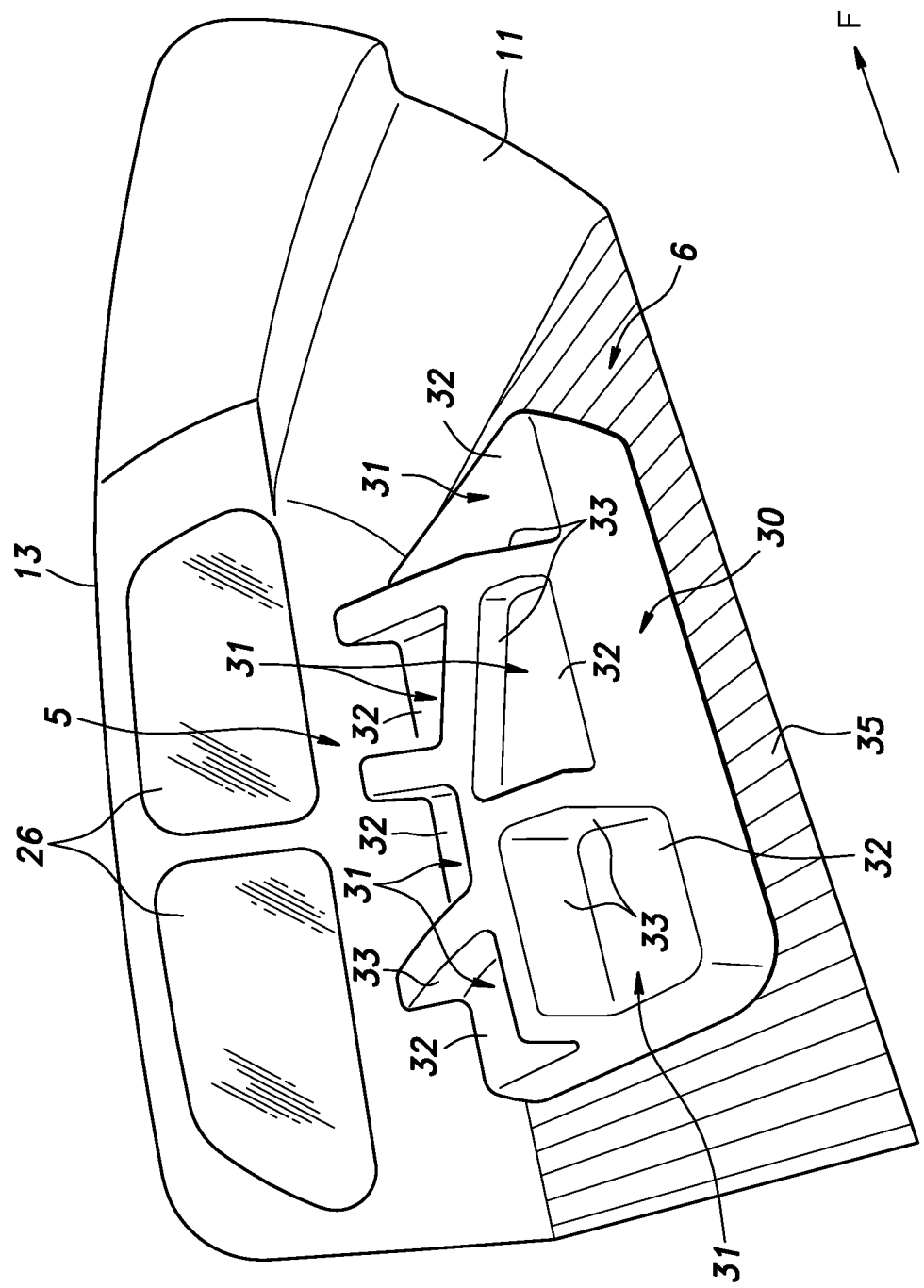
FIG. 4 is a perspective view of a cabin of the vehicle.
Figure 5:
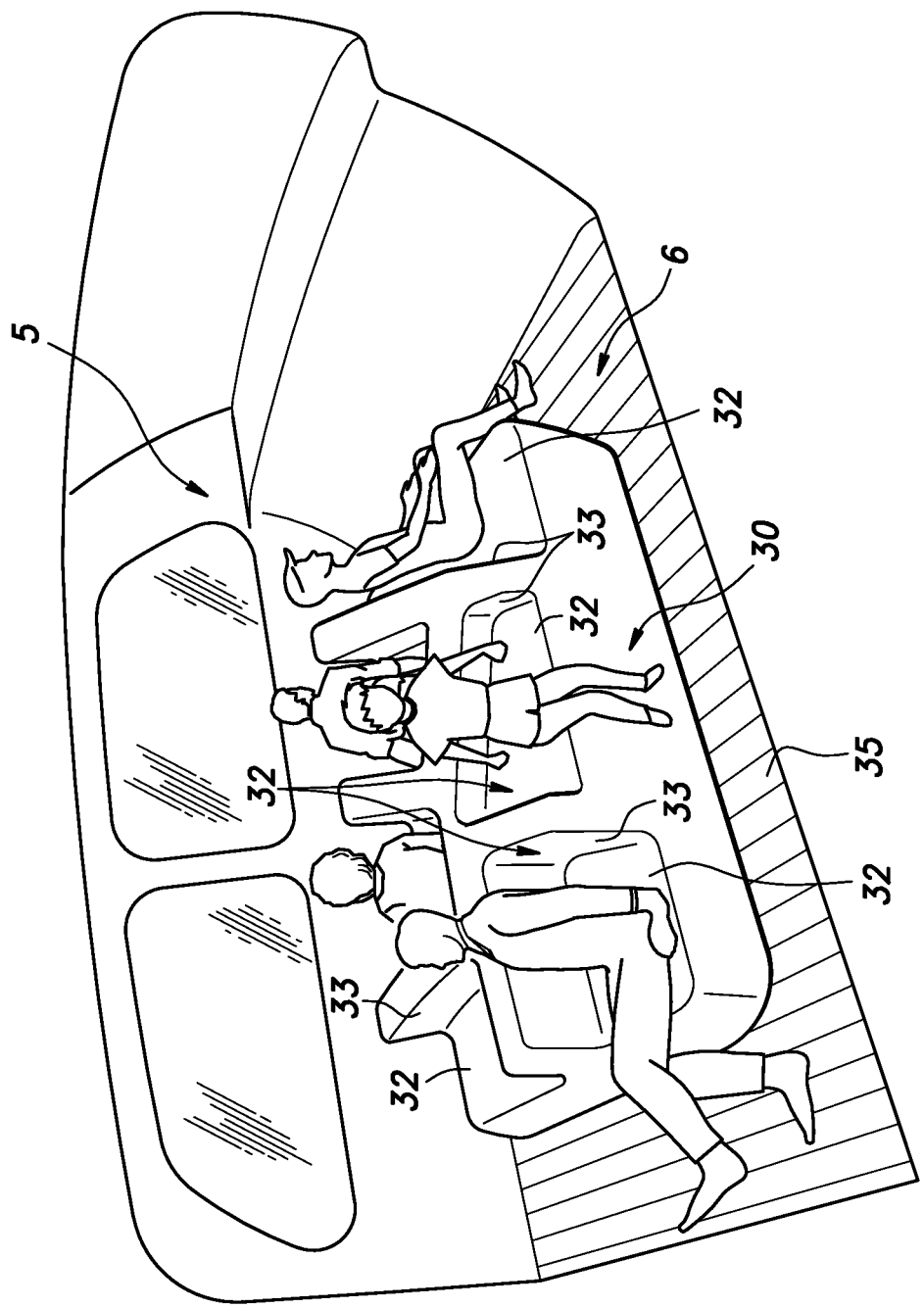
FIG. 5 is a perspective view of the cabin of the vehicle with passengers seated.
Figure 6:
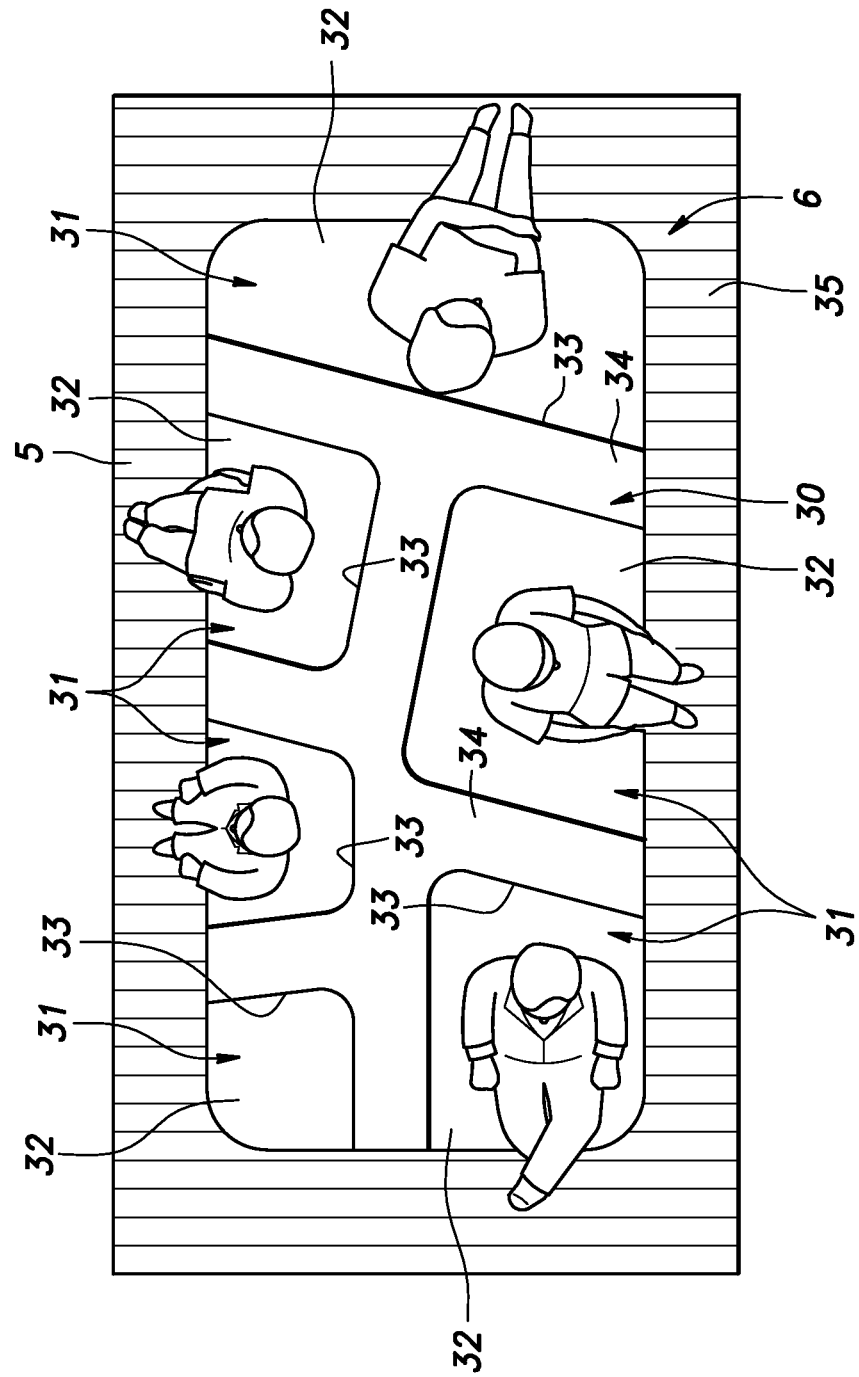
FIG. 6 is a plan view of the cabin of the vehicle.

As shown in FIGS. 4 to 6, a protruding body 30 that protrudes upward from the floor (floor surface) 6 is provided in a central part of the cabin 5. The protruding body 30 consists of a single structural body similar to a sofa and includes a frame, cushions, skins, etc. (not shown). The protruding body 30 has a substantially rectangular shape elongated in the fore and aft direction of the cabin 5 in plan view, and is provided with individual recessed portions 31 in multiple locations (six locations in the illustrated embodiment) along an outer circumference thereof.

Each recessed portion 31 has a substantially horizontal bottom defining a seating portion 32 and a substantially vertical inner peripheral surface defining a backrest portion 33. Each backrest portion 33 extends upright from an outer circumferential edge of the corresponding seating portion 32 excluding a part corresponding to a part of the outer circumference of the protruding body 30. An upper part of each backrest portion 33 forms an armrest portion 34.

Each seating portion 32 extends to the outer circumference of the protruding body 30, and a passenger can sit thereon with the feet of the passenger being placed on the part of the floor 6 around the protruding body 30 and with the back of the passenger facing inward of the cabin 5. Since each seating portion 32 is provided with a corresponding backrest portion 33, the passenger sitting thereon will have his/her back face inward of the cabin 5, and therefore, the passengers sitting on the respective seating portions 32 will face different directions outward of the cabin 5. The seating portions 32 define seating surfaces having different heights and surface areas from one another.

The floor 6 is left exposed in an area around the protruding body 30 including a portion corresponding to the door opening 21, and the part of the floor 6 around the protruding body 30 serves as a passage 35 on which the passengers can walk.

In the vehicle 1 of the first embodiment, since the passengers are prompted to sit on the seating portions 32 to face different outward directions with the back of each passenger facing inward of the cabin 5, the passengers do not catch each other's gaze easily and an awkward situation tends not to occur. Further, since the seating surfaces of the seating portions 32 have different heights from one another, the eye heights of the passengers seated on the seating portions 32 are varied. This also contributes to preventing the passengers from catching each other's gaze.

Owing to the above features, even when the vehicle is used in a ride share or as a passenger vehicle in which the passengers of the vehicle are not specified, it is possible to provide a comfortable cabin space to minimize stress of the passengers, so that the passengers in the vehicle can be relaxed. On the other hand, passengers seated in adjoining seating portions 32 can have a conversation in a natural atmosphere by simply turning their faces sideways. Further, in the vehicle 1 of the first embodiment, the legs of the passengers seated on the seating portions 32 do not interfere with each other easily.

The above features and advantages are useful particularly in the vehicle 1 having a seating capacity of several passengers and a cabin space that is not very large so that adjoining passengers are close to each other.

Further, in the vehicle 1 of the first embodiment, because the seating portions 32 define seating surfaces having different heights and surface areas from one another, each passenger can choose the seat (seating portion) having a seating surface height and a seating surface area that fits to his/her physique. This also contributes to achieving a comfortable cabin space.

In the vehicle 1 of the first embodiment, the degree of freedom of layout of the seating portions 32 in the cabin 5 is high, and compared to conventionally known seat arrangements having two or three rows of seats, a variety of novel seat arrangements (arrangements of the seating portions 32) can be achieved, and this may be expected to increase the pleasure of vehicle ride.

In the vehicle 1 of the first embodiment, passenger seats having respective seating portions 32 that are clearly separated from one another are constituted by merely forming the multiple recessed portions 31 in the single protruding body 30, and therefore, a simple configuration is achieved.

In the vehicle 1 of the first embodiment, the single protruding body 30 constitutes the chairs for allowing multiple passengers to sit thereon and the passage 35 is provided around the protruding body 30, and therefore, it is easy to move in the cabin 5 and to perform cleaning.

Figure 7:
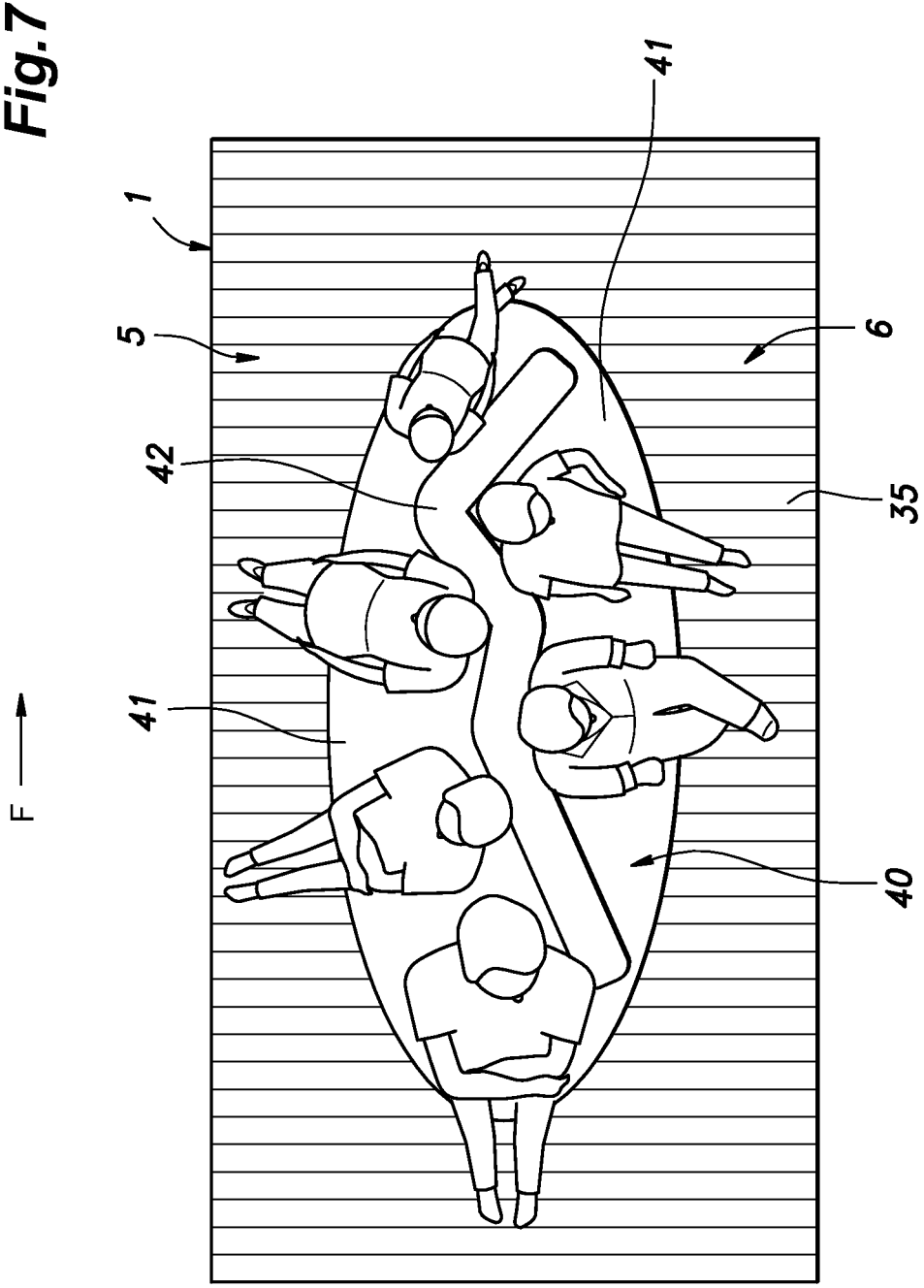
FIG. 7 is a plan view of a cabin of a vehicle according to a second embodiment.

Next, with reference to FIG. 7, a vehicle 1 according to a second embodiment will be described. In FIG. 7, the parts corresponding to those shown in FIGS. 4 to 6 will be denoted by the same reference numerals as those in FIGS. 4 to 6, and detailed explanation thereof will be omitted.

In the second embodiment, a protruding body 40 that protrudes upward from the floor 6 is provided in a central part of the cabin 5. The protruding body 40 consists of a single structural body similar to a sofa and includes a frame, cushions, skins, etc. (not shown). The protruding body 40 has an elliptical shape elongated in the fore and aft direction of the cabin 5 in plan view, and a flat upper surface thereof defines a seating portion 41 on which multiple passengers can sit. The upper surface of the protruding body 40 is provided with an upright wall 42 that extends in the fore and aft direction to separate the upper surface of the protruding body 40 or the seating portion 41 into left and right parts. Multiple passengers can sit on each of the parts of the seating portion 41 separated by the upright wall 42 along the outer circumference of the protruding body 40 with the back of each passenger facing inward of the cabin 5. The upright wall 42 also functions as a backrest of the seating portion 41.

In the second embodiment also, the floor 6 is left exposed in an area around the protruding body 40 including a portion corresponding to the door opening 21, and the part of the floor 6 around the protruding body 40 serves as a passage 35 on which the passengers can walk.

In the vehicle 1 of the second embodiment also, the passengers are prompted to sit on the left and right parts of the seating portion 41 of the protruding body 40 to face outward of the cabin 5 with the back of each passenger facing inward of the cabin 5 and the feet of each passenger placed on the part of the floor 6 around the protruding body 40, and therefore, the passengers do not catch each other's gaze easily and an awkward situation tends not to occur.

Thereby, even when the vehicle is used in a ride share or as a passenger vehicle in which the passengers of the vehicle are not specified, it is possible to provide a comfortable cabin space to minimize stress of the passengers, so that the passengers in the vehicle can be relaxed. On the other hand, passengers seated next to each other on the seating portion 41 can have a conversation in a natural atmosphere by simply turning their faces sideways. Further, in the vehicle 1 of the second embodiment also, the legs of the passengers seated on the seating portion 41 do not interfere with each other easily.

Further, in the vehicle 1 of the second embodiment, the single protruding body 40 constitutes a passenger seat having the seating portion 41 on which multiple passengers can sit, and therefore, a simple configuration is achieved. In addition, the upright wall 42 separates the upper surface of the protruding body 40 into left and right parts, and therefore, the separation between the left and right parts of the seating portion 41 defined by the upper surface is made clear.

Figure 8:
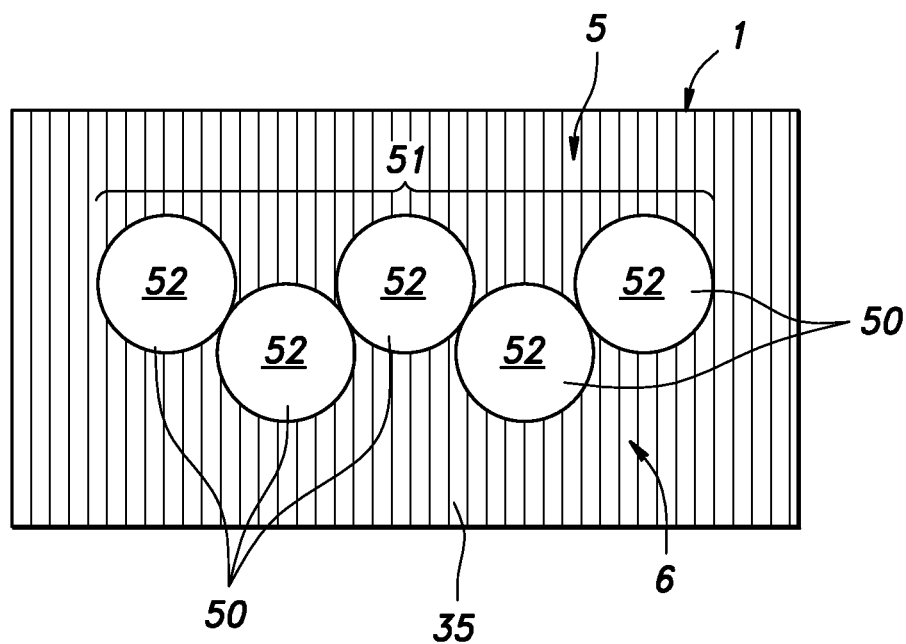
FIG. 8 is a plan view of a cabin of a vehicle according to a third embodiment.

Next, with reference to FIG. 8, a vehicle 1 according to a third embodiment will be described. In FIG. 8, the parts corresponding to those shown in FIGS. 4 to 6 will be denoted by the same reference numerals as those in FIGS. 4 to 6, and detailed explanation thereof will be omitted.

In the third embodiment, a protruding body 51 is constituted of a group of multiple cylindrical bodies 50 that protrude upward from the floor 6 of the cabin 5. The cylindrical bodies 50 are arranged in two left and right rows in a staggered fashion in plan view, such that each row extends in the fore and aft direction and the cylindrical bodies 50 in one row are in contact with the cylindrical bodies 50 in the other row. An upper surface of each cylindrical body 50 defines a seating portion 52 on which a passenger can sit. Thus, each cylindrical body 50 forms a stool.

In the third embodiment also, the floor 6 is left exposed in an area around the protruding body 51 (or around the group of the cylindrical bodies 50) including a portion corresponding to the door opening 21, and the part of the floor 6 around the protruding body 51 serves as a passage 35 on which the passengers can walk.

Since the cylindrical bodies 50 are arranged in two left and right rows in a staggered fashion in plan view, the passengers seated on the cylindrical bodies 50 can put their feet only on the part of the floor 6 forming the passage 35. Therefore, when a passenger sits on the seating portion 52 of each cylindrical body 50 with his/her feet on the floor 6, the passenger is permitted to sit only in such a direction that his/her back faces inward of the cabin 5.

In the vehicle 1 of the third embodiment also, the passengers are prompted to sit on the seating portions 52 of the cylindrical bodies 50 to face outward of the cabin 5 with the back of each passenger facing inward of the cabin 5 and the feet of each passenger placed on the part of the floor 6 around the protruding body 51, and therefore, the passengers do not catch each other's gaze easily and an awkward situation tends not to occur.

Thereby, even when the vehicle is used in a ride share or as a passenger vehicle in which the passengers of the vehicle are not specified, it is possible to provide a comfortable cabin space to minimize stress of the passengers, so that the passengers in the vehicle can be relaxed. On the other hand, passengers seated in adjoining seating portions 52 can have a conversation in a natural atmosphere by simply turning their faces sideways. Further, in the vehicle 1 of the third embodiment also, the legs of the passengers seated on the seating portions 52 do not interfere with each other easily. In addition, the number of the seating portions 52 can be easily increased and decreased by varying the number of the cylindrical bodies 50, which provides a high degree of design freedom.

Figure 9:
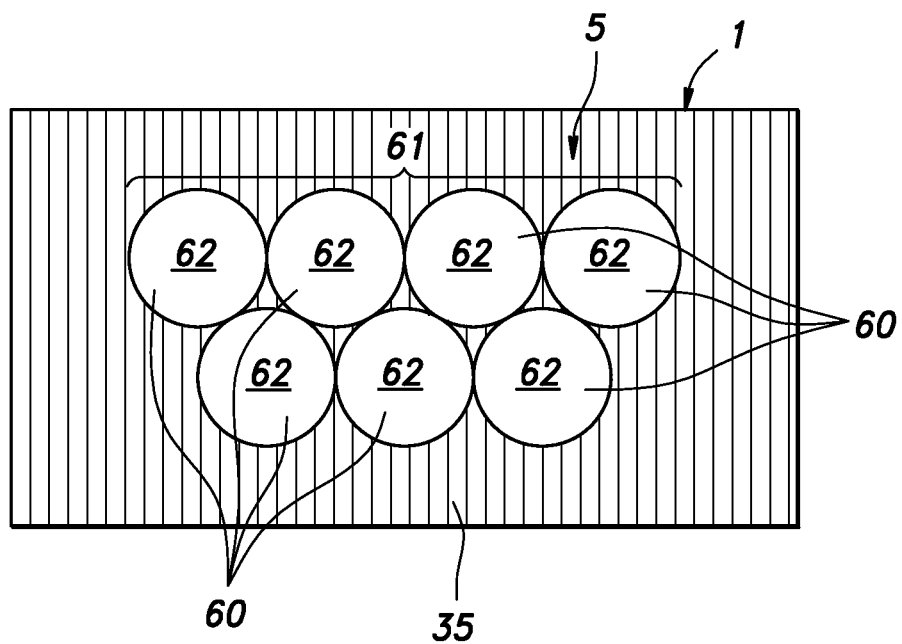
FIG. 9 is a plan view of a cabin of a vehicle according to a fourth embodiment.

Next, with reference to FIG. 9, a vehicle 1 according to a fourth embodiment will be described. In FIG. 8, the parts corresponding to those shown in FIGS. 4 to 6 will be denoted by the same reference numerals as those in FIGS. 4 to 6, and detailed explanation thereof will be omitted.

In the fourth embodiment, a protruding body 61 is constituted of a group of multiple cylindrical bodies 60 that protrude upward from the floor 6 of the cabin 5. The cylindrical bodies 60 are arranged in two left and right rows in a staggered fashion in plan view, such that each row extends in the fore and aft direction and the cylindrical bodies 60 adjacent to each other in each row are in contact with each other (like tightly stacked round hay bales). An upper surface or each cylindrical body 60 defines a seating portion 62 on which a passenger can sit. Thus, each cylindrical body 60 forms a stool.

In the fourth embodiment also, the floor 6 is left exposed in an area around the protruding body 61 (or around the group of the cylindrical bodies 60) including a portion corresponding to the door opening 21, and the part of the floor 6 around the protruding body 61 serves as a passage 35 on which the passengers can walk.

Since the cylindrical bodies 60 are arranged in two left and right rows in a staggered fashion with the cylindrical bodies 60 adjacent to each other in each row being in contact with each other in plan view, the passengers seated on the cylindrical bodies 60 can put their feet only on the part of the floor 6 forming the passage 35. Therefore, when a passenger sits on the seating portion 62 of each cylindrical body 60 with his/her feet on the floor 6, the passenger is permitted to sit only in such a direction that his/her back faces inward of the cabin 5.

In the vehicle 1 of the fourth embodiment also, the passengers are prompted to sit on the seating portions 62 of the cylindrical bodies 60 to face outward of the cabin 5 with the back of each passenger facing inward of the cabin 5 and the feet of each passenger placed on the part of the floor 6 around the protruding body 61, and therefore, the passengers do not catch each other's gaze easily and an awkward situation tends not to occur.

Thereby, even when the vehicle is used in a ride share or as a passenger vehicle in which the passengers of the vehicle are not specified, it is possible to provide a comfortable cabin space to minimize stress of the passengers, so that the passengers in the vehicle can be relaxed. On the other hand, passengers seated in adjoining seating portions 62 can have a conversation in a natural atmosphere by simply turning their faces sideways. Further, in the vehicle 1 of the fourth embodiment also, the legs of the passengers seated on the seating portions 62 do not interfere with each other easily. In addition, the seating portions 62 can be arranged densely, and the number of the seating portions 62 can be easily increased and decreased by varying the number of the cylindrical bodies 60, which provides a high degree of design freedom.

Figure 10:
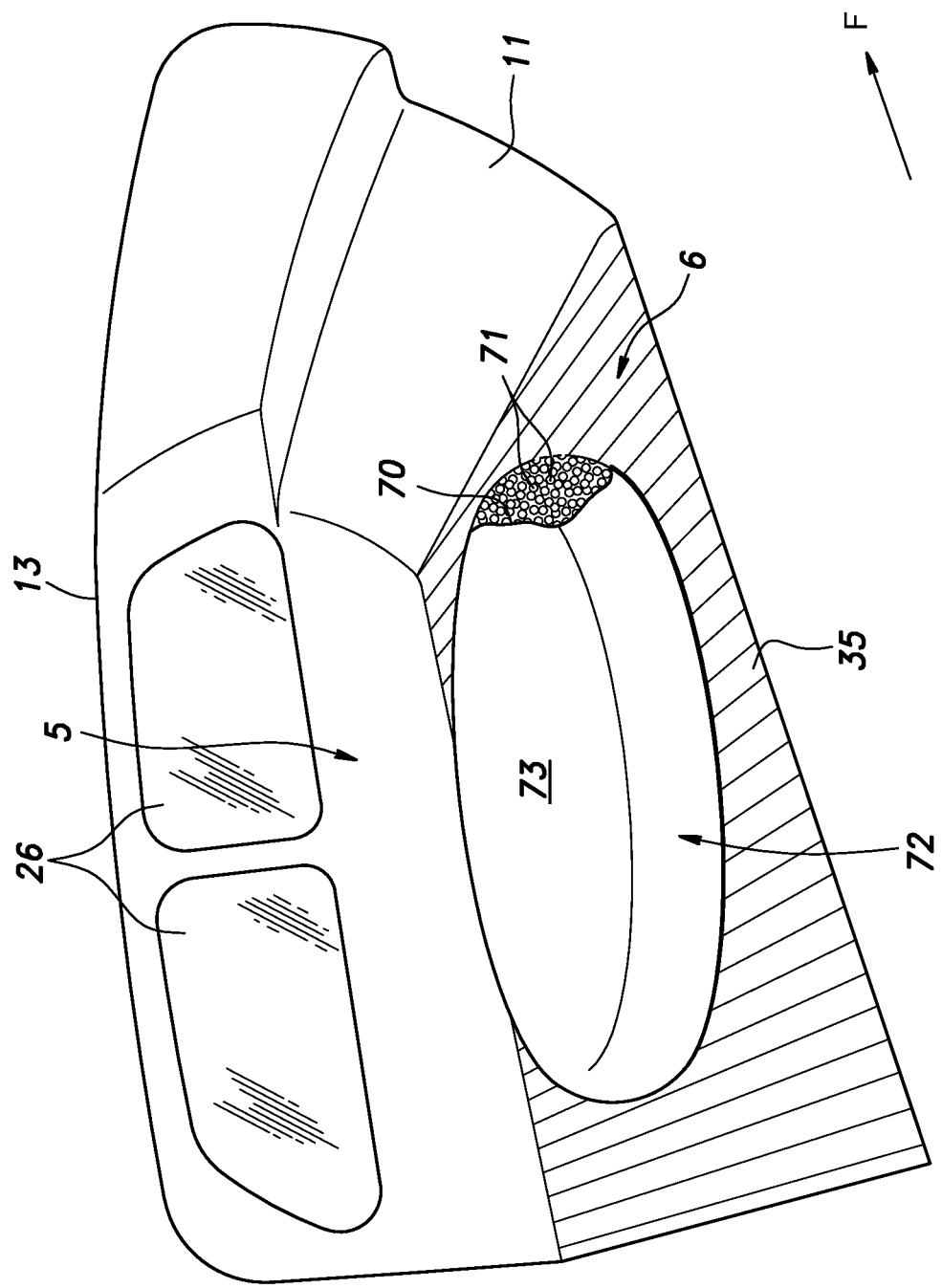
FIG. 10 is a plan view of a cabin of a vehicle according to a fifth embodiment.

Next, with reference to FIG. 10, a vehicle 1 according to a fifth embodiment will be described. In FIG. 10, the parts corresponding to those shown in FIGS. 4 to 6 will be denoted by the same reference numerals as those in FIGS. 4 to 6, and detailed explanation thereof will be omitted.

In the fifth embodiment, a protruding body 72 constituted of a bag-shaped skin 70 and beads 71 filling the skin 70 is disposed on the floor 6 of the cabin 5. The protruding body 72 has a substantially elliptical shape elongated in the fore and aft direction in plan view. An upper surface of the protruding body 72 serves as a seating portion 73. The protruding body 72 is indefinite in shape and is deformable in accordance with the loads of passengers seated on the seating portion 73. It is to be noted that in FIG. 10, the protruding body 72 is shown with a part thereof broken away.

In the fifth embodiment, the protruding body 72 is deformed due to the loads of the passengers seated on the seating portion 73, whereby recesses corresponding to the respective passengers are formed. In this way, the seating portion 73 is delimited into parts corresponding to the respective passengers in accordance with the number of the passengers to form seats comfortable to sit on. Each passenger will sit on an outer peripheral part of the seating portion 73 of the protruding body 72 with his/her feet on the part of the floor 6 around the protruding body 72, and naturally, the passenger will sit in such a direction that the back of the passenger faces inward of the cabin 5.

In the vehicle 1 of the fifth embodiment also, the passenger are prompted to sit on the seating portion 73 of the protruding body 72 to face outward of the cabin 5 with the back of each passenger facing inward of the cabin 5 and the feet of each passenger placed on the part of the floor 6 around the protruding body 72, and therefore, the passengers do not catch each other's gaze easily and an awkward situation tends not to occur.

Thereby, even when the vehicle is used in a ride share or as a passenger vehicle in which the passengers of the vehicle are not specified, it is possible to provide a comfortable cabin space to minimize stress of the passengers, so that the passengers in the vehicle can be relaxed. On the other hand, passengers seated next to each other on the seating portion 73 can have a conversation in a natural atmosphere by simply turning their faces sideways. Further, in the vehicle 1 of the fifth embodiment also, the legs of the passengers seated on the seating portion 73 do not interfere with each other easily.

In the foregoing, the present invention has been described in terms of preferred embodiments thereof, but the present invention is not limited to these embodiments, and may be modified appropriately within the scope of the present invention. For instance, the protruding body may have any shape elongated in the fore and aft direction in plan view, such as an oval shape, a gourd-like shape, a trapezoidal shape, etc. The vehicle according to the present invention is not limited to an autonomous vehicle, and may be a vehicle driven by a driver, a campervan, or a trailer that can be hitched to a tractor or any other pulling vehicle.

Also, not all of the component parts shown in the foregoing embodiments are necessarily indispensable, and they may be selectively used as appropriate without departing from the scope of the present invention.

The invention claimed is:

1. A vehicle comprising a protruding body that protrudes upward from a floor surface in a central part of a cabin of the vehicle,
   wherein the protruding body includes one or more seating portions on an outer periphery thereof such that multiple passengers can sit on the one or more seating portions with a back of each passenger facing inward of the cabin, and
   wherein the one or more seating portions include multiple seating portions, and the protruding body is constituted of multiple cylindrical bodies arranged in two rows in a staggered fashion in plan view, each cylindrical body having an upper surface defining one of the multiple seating portions.

2. The vehicle according to claim 1, wherein the one or more seating portions include seating portions that define seating surfaces having different heights from one another.

3. The vehicle according to claim 1, wherein the one or more seating portions include seating portions that define seating surfaces having different surface areas from one another.

4. A vehicle comprising a protruding body that protrudes upward from a floor surface in a central part of a cabin of the vehicle,
   wherein the protruding body includes one or more seating portions on an outer periphery thereof such that multiple passengers can sit on the one or more seating portions with a back of each passenger facing inward of the cabin, and
   wherein the one or more seating portions include multiple seating portions, and the protruding body is constituted of multiple cylindrical bodies arranged in two rows in a staggered fashion with the cylindrical bodies adjacent to each other in each row contacting each other in plan view, each cylindrical body having an upper surface defining one of the multiple seating portions.

* * * * *